Oct. 22, 1935.  W. R. FREEMAN  2,018,351
BRAKE CONTROL APPARATUS
Filed March 9, 1932
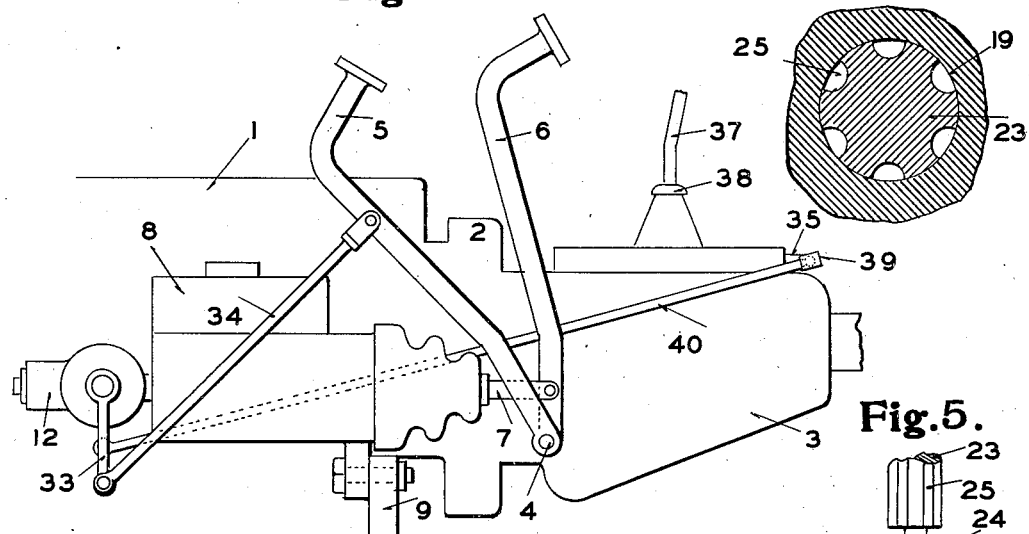
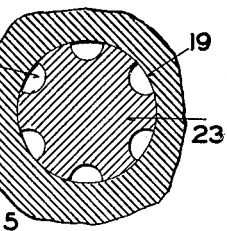
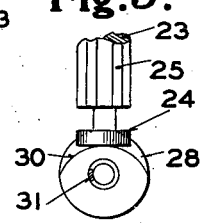
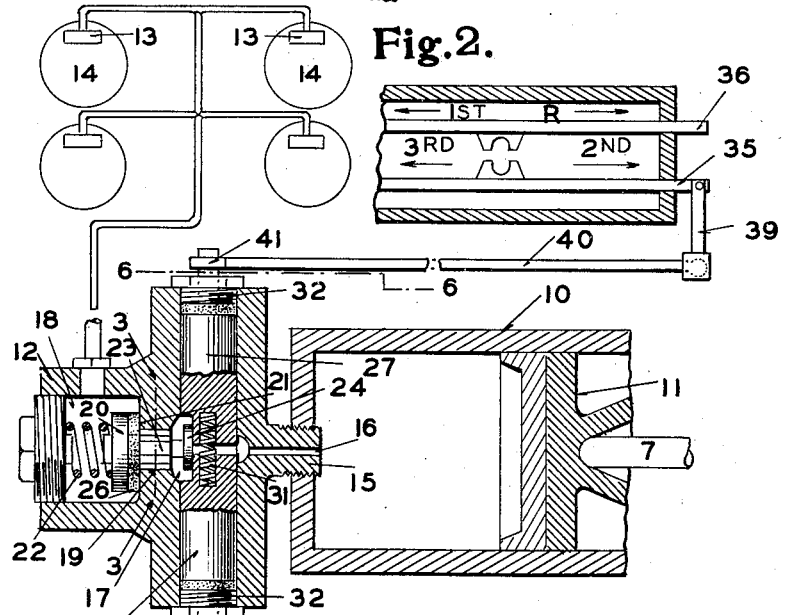
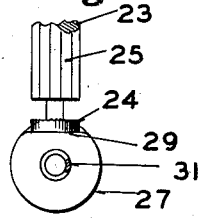
Inventor
W. R. FREEMAN
By E. E. Schuffman
Att'y.

Patented Oct. 22, 1935

2,018,351

UNITED STATES PATENT OFFICE 2,018,351

BRAKE CONTROL APPARATUS

Walter R. Freeman, Jay, Okla., assignor to Mid-West Engineering Corporation, Tulsa, Okla., a corporation of Oklahoma Application March 9, 1932, Serial No. 597,674

10 Claims. (Cl. 192—4)

My invention relates to braking apparatus and especially to the control of the vehicle brakes by the brake and clutch pedals and the change speed transmission mechanism of the vehicle.

In motor vehicles which are equipped with means controlled by the clutch pedal for maintaining the brakes in applied position, as for example, the means disclosed in Patent No. 1,800,520 issued April 14, 1931 to Ernest H. Schweering and myself, the normal operation in stopping the moving vehicle at a desired point, as for instance in parking or at a street intersection, is to leave the transmission in gear, release the clutch, and apply the brakes. As long as the clutch is released, the brakes will be maintained in their applied position and, therefore, if the brakes have been applied with too great a force, the vehicle will be stopped before it reaches the desired point unless the clutch is reengaged to release the brakes. It is the object of my invention to avoid this difficulty and since the transmission is generally in its "second" or "high" gear when bringing the vehicle to a stop, I achieve this object by providing means whereby the clutch operated brake holding means will be inoperative when the transmission gears are in "second" or "high" gear relation.

I will disclose my invention as applied to vehicles equipped with clutch control means for hydraulically actuated brakes, but it is to be understood that the invention may be applied equally well to vehicles equipped with mechanically actuated brakes and with means for holding the brakes in applied position.

In the accompanying drawing Figure 1 is a side view of my improved control attachment in its assembled relation with the hydraulic brake applying means, the clutch pedal, and the transmission of the vehicle; Figure 2 is a view, partly in cross section, of the braking system, the control valve, and its connection with the gear shifting mechanism of the transmission; Figure 3 is a cross sectional view on the line 3—3 of Figure 2; Figures 4 and 5 are detail views of the structure disclosed in Figure 2; and Figure 6 is a view on the line 6—6 of Figure 2.

Referring to the drawing, I indicates the engine of a motor vehicle which is connected by means of a clutch 2 and a change speed transmission 3 to the road wheels of the vehicle for supplying power thereto in the well known manner. The clutch 2 is operated by the clutch shaft 4 and the clutch pedal 5, the clutch being disengaged when the pedal is in depressed position, as shown in Figure 1. The brake pedal 6 is pivotally mounted on the clutch shaft and is connected by the thrust member 7 with the compressor unit 8 of an hydraulically actuated brake system. The compressor unit is mounted on a frame portion 9 of the vehicle and is composed of the usual cylinder 10 and piston 11 and is connected through my novel control valve 12 and by suitable conduits to the brake applying cylinders 13 of the wheel brakes 14.

My novel control valve 12 comprises a threaded extension 15 screwed into the end of the cylinder 16, the extension being provided with a bore 16 communicating with a chamber 17 which in turn communicates by means of an opening 19 with a second chamber 18 connected to the brake cylinders. The opening 19 is controlled by a valve 20 biased against its seat 21 by a spring 22. The stem 23 of the valve extends through the opening 19 into the chamber 17 and is provided with a headed end 24 for cooperation with a pair of valve controlling cams to be presently described. In order to allow liquid to flow through the opening 19, the valve stem is provided with a plurality of longitudinally extending grooves 25. The valve is also provided with a rubber washer 26, attached thereto by means of a groove in the valve stem, for preventing leakage of fluid between the valve and its seat when the valve is closed.

A pair of shafts 27 and 28 extend into the chamber 17 from opposite sides thereof and at right angles to the valve stem. The adjacent ends of these shafts are each provided with a cam cooperating with the headed end 24 of the valve stem. The cam 29 on the shaft 27 is provided with a flattened surface and the cam 30 on the shaft 28 is provided with a curved surface and when they are in the position shown in Figure 2, they allow the spring 22 to seat the valve. A spring 31 is interposed between the shafts for biasing the shafts against the packing glands 32 screwed into the housing of the valve.

The end of the shaft 28 which projects out of the valve housing, is provided with an arm 33 which is connected by an adjustable rod 34 with the clutch pedal 5. The length of the arm 33 and rod 34 are so proportioned that when the clutch pedal is depressed, as shown in Figure 1, to disengage the clutch, the shaft 28 and cam 30 will be rotated to such a position as to permit the valve to seat if allowed to do so by the cam 29. When the clutch pedal is in clutch engaged position, the position of the cam 30 will be such as to lift the valve from its seat against the action of the valve spring 22.

The transmission 3 is shown as being provided with the usual shift rods 35 and 36 adapted to be selected and actuated by the gear shifting lever 37 universally mounted at 38. The transmission is of the standard construction, the rod 36 controlling the first and reverse gears when moved longitudinally, as shown by the arrows, and the rod 35 controlling the second and high gears when moved longitudinally, as shown by the arrows.

The end of the second and high gear selecting rod which extends out of the transmission housing, is provided with a laterally extending arm 39 connected by means of a ball joint to a rod 40. The rod 40 extends downwardly alongside of the transmission and is connected to the short arm 41 secured to the outer end of the cam shaft 27. The length of arm 41 is so proportioned to the travel of the rod 35, that when the rod 35 is in either of its gear engaging positions, the cam 29 will hold the valve off its seat. When the rod 35 is in its neutral position, as shown in Figure 1, the cam 29 will be in such position as to permit the valve to seat if allowed to do so by the cam 30.

In operation, when the gear shift lever 37 is in its neutral position, or in a position to have operated the first and reverse gear rod 36, the cam 29 is in the position shown in Figures 2 and 4, permitting the valve 20 to be operated solely by the cam 30 controlled by the clutch pedal. If, under these conditions, it is desired to stop the vehicle and maintain the brakes applied without maintaining pressure on the brake pedal, as for example during a traffic stop on an incline, the clutch would be first disengaged, thereby rotating the cam 30 to such a position as to allow the valve to be seated by the spring 22, and then the brakes applied. The fluid under pressure created by movement of the piston 11, will automatically unseat the valve against the action of the valve spring and apply pressure to the brakes. This pressure will be maintained without the necessity of holding the foot upon the brake pedal since the valve will immediately be reseated by the spring as soon as the piston pressure is released. When the clutch pedal is reengaged, the cam 30 will be rotated to unseat the valve and release the brakes. The operator will, therefore, be able to engage the clutch and release the brakes by the use of only one foot, allowing the other foot to be free to actuate the accelerator to speed up the engine to start the vehicle promptly.

If the transmission is in high or second gear, as is usually the case when the vehicle is moving, and it is desired to stop, the cam 29 will be in a position to maintain the valve open against the spring 22. Under these conditions, the braking system will operate in the same manner as it would if the valve were not in the system. The movement of the clutch pedal will have no effect upon the valve and, therefore, when the clutch is disengaged, the brakes are controlled solely by the pressure on the brake pedal and the vehicle may be stopped at any desired point by the proper manipulation of the pedal in the usual manner.

From the above description it is seen that I have eliminated the control of the brakes by the clutch pedal when the transmission is in high or second gear, thus permitting the operator to freely manipulate the brakes in stopping the vehicle in traffic or at a traffic stop signal, and by placing the transmission in neutral or in low gear, preparatory to starting again as soon as allowed, the clutch control of the brakes is rendered effective, whereby the operator's foot may be moved from the brake pedal to the accelerator without thereby releasing the brakes.

Having fully described my invention, what I claim as new and desire to secure by Letters Patent of the United States is:

1. In apparatus of the class described, the combination of a fluid brake mechanism and a shifting mechanism for a change speed gearing, valve means for holding the brake applied, and means operated by the shifting mechanism when it is in its high speed or next to high speed position to render the holding means inoperative, said means being ineffective under other positions of the shifting mechanism.

2. In a vehicle provided with clutch and brake mechanisms and a shifting rod for selecting the second and high speed gear ratios of a change speed gearing and with means actuated by the clutch mechanism for holding the brakes applied, means actuated by the shifting rod when it is brought to its second or high speed gear ratio position to render the holding means inoperative.

3. In a vehicle provided with brake mechanism and a shifting rod for selecting the second and high speed gear ratios of a change speed gearing and with means for holding the brakes applied, means actuated by the shifting rod when it is brought to its second or high speed gear ratio position to render the holding means inoperative.

4. In a vehicle provided with a fluid operated brake system, a change speed gearing and shifting mechanism for said gearing, the combination of a valve in said brake system for holding the brakes applied, and means controlled by the shifting mechanism to render said valve inoperative.

5. In combination with the clutch mechanism, the fluid braking system and the change speed transmission of a motor vehicle, a valve in said braking system for holding the brakes applied, and a pair of independently operable means for controlling said valve, one of said means being controlled by the clutch mechanism and the other of said means being controlled by an element of the transmission.

6. In a motor vehicle provided with a clutch mechanism, a fluid braking system, a change speed gearing and a gear shifting rod for said gearing, the combination of means in said brake system for holding the brakes applied, means operable by the clutch mechanism for controlling the first named means, and means operated by the shifting rod to render the first named means inoperative.

7. In a motor vehicle provided with a clutch mechanism, a fluid braking system, a change speed gearing and a gear shifting rod for selecting the highest gear ratio of the gearing, the combination of a valve in said brake system for holding the brakes applied, means comprising a cam for closing said valve when the clutch mechanism is operated for disengaging the clutch, and cam means operated by the shifting rod when the gearing is in its highest speed ratio position for holding said valve in open position.

8. In combination with the clutch mechanism, the brake mechanism, and the change speed transmission of a motor vehicle, of means governed by the clutch mechanism for holding the brakes applied, and means operable by the transmission being moved to a selected speed relation to render said holding means inoperative while said clutch mechanism is in disengaged position.

9. In combination with the clutch mechanism, the brake mechanism, and the change speed gearing of a motor vehicle, of means governed by the clutch mechanism for holding the brakes applied, and means operable by the gearing being moved to either of its highest or next to highest speed relations to render said holding means inoperative while said clutch mechanism is in disengaged position.

10. The combination with the clutch mechanism, brake mechanism, and change speed transmission mechanism of a motor vehicle, of means for holding the brakes applied, operative connections between said holding means and the clutch mechanism and between the holding means and the transmission mechanism, said holding means being placed in an operable position by said operative connections when the clutch is in its disengaged position and the elements of the transmission are in a selected speed relation, and being placed in an inoperable position by said connections when the clutch is in its disengaged position and the elements of the transmission are in another selected speed relation.

WALTER R. FREEMAN.